(12) United States Patent
Shen (10) Patent No.: US 9,992,315 B2
(45) Date of Patent: Jun. 5, 2018

(54) TERMINAL AND TERMINAL MULTIPLE PROTECTION METHOD

(71) Applicant: ZTE Corporation, Shenzhen, Guangdong (CN)

(72) Inventor: Shaowu Shen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days. days.

(21) Appl. No.: 15/514,163

(22) PCT Filed: Apr. 1, 2015

(86) PCT No.: PCT/CN2015/075720
§ 371 (c)(1),
(2) Date: Mar. 24, 2017

(87) PCT Pub. No.: WO2016/045343
PCT Pub. Date: Mar. 31, 2016

(65) Prior Publication Data
US 2017/0310801 A1   Oct. 26, 2017

(30) Foreign Application Priority Data

Sep. 25, 2014 (CN) .......................... 2014 1 0499643

(51) Int. Cl.
*H04M 1/19* (2006.01)
*H04W 88/02* (2009.01)
(Continued)

(52) U.S. Cl.
CPC .............. *H04M 1/19* (2013.01); *G06F 21/74* (2013.01); *H04B 1/00* (2013.01); *H04B 1/3838* (2013.01);
(Continued)

(58) Field of Classification Search
CPC ....... H04B 7/08; H04B 1/0475; H04W 88/02; H04W 12/06
(Continued)

(56) References Cited

U.S. PATENT DOCUMENTS

| | | | |
|---|---|---|---|
| 2007/0298733 A1* | 12/2007 | Cole | H04B 17/101 455/114.2 |
| 2013/0017862 A1* | 1/2013 | Lee | H04W 60/005 455/558 |
| 2014/0122820 A1* | 5/2014 | Park | G06F 12/145 711/163 |

FOREIGN PATENT DOCUMENTS

| CN | 1808918 A | 7/2006 |
|---|---|---|
| CN | 101119546 A | 2/2008 |

(Continued)

OTHER PUBLICATIONS

International Search Report in international application No. PCT/CN2015/075720, dated Jul. 3, 2015, 2 pgs.
(Continued)

*Primary Examiner* — Kiet M Doan
(74) *Attorney, Agent, or Firm* — Cooper Legal Group, LLC (57) ABSTRACT

Disclosed are a terminal and a terminal multiple protection method. The radiation processing module is configured to convert after preprocessing a first signal received from the external into a second signal that can be recognized by a baseband chip of a terminal. A radiation diagnosis module is configured to extract signal characteristics expressed by the second signal, to classify signals via comparison of signal characteristics, to diagnose to acquire a signal type to which the second signal pertains, and to output the second signal to a radiation protection control module for executing a relevant protection process for the corresponding signal type. The radiation protection module is configured to acquire the (Continued)

second signal and the corresponding signal type thereof and to selectively execute a relevant protection control process among multiple protection processes on the basis of the corresponding signal type.

16 Claims, 3 Drawing Sheets

(51) Int. Cl.
    *H04B 1/3827*     (2015.01)
    *H04W 12/02*     (2009.01)
    *G06F 21/74*     (2013.01)
    *H04B 1/00*     (2006.01)
    *H04B 17/10*     (2015.01)

(52) U.S. Cl.
    CPC .......... *H04B 17/101* (2015.01); *H04W 12/02* (2013.01); *H04W 88/02* (2013.01)

(58) Field of Classification Search
    USPC ..... 455/456.1, 232.1, 127.1, 556.1, 558, 76; 370/311, 252
    See application file for complete search history.

(56) References Cited

FOREIGN PATENT DOCUMENTS

| | | |
|---|---|---|
| CN | 101354412 A | 1/2009 |
| CN | 101505467 A | 8/2009 |
| CN | 101588401 A | 11/2009 |
| CN | 102158597 A | 8/2011 |
| CN | 202794348 U | 3/2013 |
| CN | 202798822 U | 3/2013 |
| CN | 103167095 A | 6/2013 |
| CN | 203324386 U | 12/2013 |
| CN | 203337260 U | 12/2013 |
| CN | 103905589 A | 7/2014 |

OTHER PUBLICATIONS

English Translation of the Written Opinion of the International Search Authority in international application No. PCT/CN2015/075720, dated Jul. 3, 2015, 7 pgs.

* cited by examiner

TERMINAL AND TERMINAL MULTIPLE PROTECTION METHOD

TECHNICAL FIELD

The disclosure relates to the technical field of protection techniques designed for smart terminals, and in particular to a terminal and a multiple protection method for a terminal.

BACKGROUND

The inventor of the present application at least discovers the following technical problems in the related art in a process of implementing the technical solutions in the embodiments of the present application.

With the rapid development of an information society and the popularization of electronic and microwave devices, a user is located in a complicated and diverse electronic wave radiation environment, there are low-frequency electromagnetic radiation signals such as household appliances, office computers and automotive electronics, and there are also high-frequency electromagnetic radiation signals such as mobile terminals, radio base stations and television broadcasts as well as microwave radiation signals such as induction cookers and microwave ovens. These electronic devices will emit electromagnetic waves having different wavelengths and frequencies during usage. If the radiation power density is over-high, due to a long-term accumulated effect, physiological dysfunction is easily caused when a person stays in the complicated electromagnetic environment for a long time, thereby causing serious consequences of headache, slight fever, sleeplessness, tiredness, pregnant abortion, foetus variation and Cell cancerization. Therefore, during usage, functional demands of a smart mobile terminal for radiation protection monitoring and anti-radiation processing become extremely important.

Meanwhile, due to the diversity of radio frequency bands, stray interferences of other electronic devices to a mobile phone, adjacent-channel interferences and mutual stray influences between mobile phones and same-frequency and harmonic interferences of other radio functions in a mobile phone such as WIFI, BT, DTV and NFC to 2G/3G/4G exist in a space where we live anytime. Various interferences will greatly influence the receiving sensitivity of a mobile phone, thereby influencing the call completion ratio, communication quality and internet speed of a user. So, anti-interference demands of the mobile phone are necessary.

In addition, due to functional diversity and convenience, a smart terminal has already become a necessary tool for communication and contact between a person and the outside, and demands for information security and communication security also exist. It is predictable that hackers and various criminal offenders will turn to a smart mobile terminal in future and will gain high illegal benefits by stealing personal information. A smart anti-eavesdropping phone should be designed urgently to solve the problems how to protect a communication process of people from being eavesdropped, how to ensure that transmission files of people will not be eavesdropped by an air interface and how to protect communication signals of people from being maliciously interrupted.

Now, a common triple protection method for a mobile phone includes: (1) adopting a dedicated radiation detection apparatus such as a monitoring system, a monitor, and a radio integrated field strength meter; (2) detecting radiation of a and y rays as well as photons; (3) detecting via a conventional radiation sensor; (4) receiving an electromagnetic wave signal via an electromagnetic induction coil, a wideband antenna, an antenna array and a multi-beam antenna; (5) adopting a pure electromagnetic radiation monitoring apparatus without a radiation protection function; (6) preventing electromagnetic radiation by selecting an optimal beam and signal quality; (7) adopting an auxiliary device such as a dedicated radiation protection housing, an external antenna and a microphone to prevent communication radiation; (8) detecting and making statistics on own transmitting power integrals of a terminal to prevent radiation; and (9) in an anti-interference testing system applied to a base station, adopting a dedicated shielding body and wave absorbing material to prevent radiation.

For the aforementioned mode 1, the dedicated radiation detection apparatus is not portable due to a huge system. For the aforementioned mode 2, the detected radiation is rays of other types instead of electromagnetic waves. For the aforementioned mode 3, the adopted conventional radiation sensor is large in size and high in cost. For the aforementioned mode 4, a receiving apparatus for radiation detection is an antenna of other types, the requirements for the antenna are high, and a needed antenna space is large. For the aforementioned mode 5, an electromagnetic radiation detection function, instead of other protection functions, is provided. For the aforementioned mode 6, a radiation protection mode refers to detecting the quality of different beam antennae. For the aforementioned mode 7, an external radiation protection apparatus is adopted for assistance, so the mechanism is huge, the functionality is single, and the apparatus is not portable. For the aforementioned mode 8, own power radiation dose is only detected, so the functionality is single. For the aforementioned mode 9, the mode is relatively applied to base stations, and an additional shielding apparatus is adopted for radiation protection.

In conclusion, any one of the aforementioned solutions in prior art has respective defects. A targeted solution is not proposed for the problem about implementing multiple protections on a single terminal, particularly, the aim of implementing multiple protections while keeping cost low is not achieved.

SUMMARY

In view the above, the embodiments of the disclosure are intended to provide a terminal and a multiple protection method for a terminal, capable of solving, at least, the aforementioned problems in prior art, and implementing multiple protection functions while keeping cost low.

The technical solutions in the embodiments of the disclosure are implemented as follows.

An embodiment of the disclosure provides a terminal, which may include:

a radiation processing module arranged to convert, through pre-processing, a first signal received from the outside into a second signal which can be identified by a baseband chip of the terminal;

a radiation diagnosis module arranged to extract signal characteristics represented by the second signal, classify the second signal by comparing the signal characteristics, diagnose to obtain a signal type to which the second signal pertains, and output the second signal to a radiation protection control module for executing a protection process for the signal type; and the radiation protection control module arranged to acquire the second signal and its signal type, and select and execute a protection process among multiple protection processes according to the signal type.

In an embodiment, the radiation protection control module may further include at least two of the following sub-modules:

a first protection control sub-module arranged to, when the second signal pertains to a first signal type, initiate a first mode of the multiple protection processes, so as to implement radiation protection control;

a second protection control sub-module arranged to, when the second signal pertains to a second signal type, initiate a second mode of the multiple protection processes, so as to implement anti-interference control; and a third protection control sub-module arranged to, when the second signal pertains to a third signal type, initiate a third mode of the multiple protection processes, so as to implement anti-eavesdropping control.

In an embodiment, the radiation processing module may be further arranged to filter, via a first stage Band Pass Filter (BPF), the first signal subjected to segmented frequency sweep and signal separation, amplify the filtered signal via a Low Noise Amplifier (LNA), then perform frequency mixing on the amplified signal such that the frequency of the mixed signal supports demodulation within a frequency band range of the terminal, and filter and demodulate the mixed signal to obtain the second signal.

In an embodiment, the terminal may further include:

a radiation receiving module, located in front of the radiation processing module, and connected to the radiation processing module, the radiation receiving module being arranged to receive the first signal from the outside of the terminal, and output the first signal to the radiation processing module for pre-processing, the first signal including: a communication signal and/or an electromagnetic wave signal.

In an embodiment, the terminal may further include:

a radiation control module and a radiation detection module, herein the radiation control module is connected to the radiation processing module, the radiation detection module, the baseband chip, the radiation diagnosis module and the radiation receiving module, and the radiation control module is arranged to send a control instruction to control all modules connected thereto, such that all the modules connected thereto implement, in an entire radiation process according to the control instruction, signal pre-processing, signal detection, switching of the baseband chip between a detection mode and a normal radio working mode, signal diagnosis, and activating and deactivating of the protection process among the multiple protection processes.

In an embodiment, the radiation detection module may be arranged to implement pre-processing for classification and identification of the second signal, and output the pre-processed signal to the radiation control module for making a decision, the second signal being classified into: a single-carrier signal, a noise signal and a modulation signal; and the radiation control module may be further arranged to make a decision for the pre-processed signal, and output the control instruction and the pre-processed signal to the radiation diagnosis module for classifying the pre-processed signal so that the protection process is selected.

In an embodiment, the radiation diagnosis module may be further arranged to: filter out internal self-radiation and interference signals and then classify the second signal; if it is detected that the strength or dose of the second signal reaches a threshold, classify the second signal as the first signal type; if it is detected that the second signal interferes with a current in-use signal and frequency band, classify the second signal as the second signal type; and if it is detected that the second signal satisfies a preset condition for malicious eavesdropping, classify the second signal as the third signal type.

When the radiation processing module, the radiation diagnosis module, the radiation protection control module, the first protection control sub-module, the second protection control sub-module, the third protection control sub-module, the radiation receiving module, the radiation control module and the radiation detection module execute processing, each of these modes may be implemented by a Central Processing Unit (CPU), a Digital Signal Processor (DSP) or a Field-Programmable Gate Array (FPGA).

An embodiment of the disclosure further provides a multiple protection method for a terminal, which may include that:

a first signal received from the outside is converted, through pre-processing, into a second signal which can be identified by a baseband chip of the terminal;

signal characteristics represented by the second signal are extracted, the second signal is classified by comparing the signal characteristics, a signal type to which the second signal pertains is obtained by diagnosis, and the second signal is output; and the second signal and its signal type are acquired, and a protection process among multiple protection processes is selected and executed according to the signal type.

In an embodiment, the method may further include that:

before the step that the first signal received from the outside is converted, through pre-processing, into the second signal which can be identified by the baseband chip of the terminal, it is detected whether to activate multiple protection processes, and if so, the terminal switches to a radiation detection mode to trigger extraction of the signal characteristics represented by the second signal, so as to classify the second signal.

In an embodiment, the step that the first signal received from the outside is converted, through pre-processing, into the second signal which can be identified by the baseband chip of the terminal may include that:

an intermediate frequency signal is formed by means of separation, filtration, amplification and down-conversion mixing performed on the first signal; and the second signal is obtained by means of second stage filtration and detection demodulation performed on the intermediate frequency signal.

In an embodiment, the method may further include that:

after the step that the first signal received from the outside is converted, through pre-processing, into the second signal which can be identified by the baseband chip of the terminal, a type of an electromagnetic signal is pre-determined and separated by means of spectral characteristics of different electromagnetic waves to obtain a pre-processed signal.

In an embodiment, the step that signal characteristics represented by the second signal are extracted, the second signal is classified by comparing the signal characteristics and the signal type to which the second signal pertains is obtained by diagnosis may include that:

internal self-radiation and interference signals are filtered out, and then the second signal is classified;

if it is detected that the strength or dose of the second signal reaches a threshold, the second signal is classified as a first signal type;

if it is detected that the second signal interferes with a current in-use signal and frequency band, the second signal is classified as a second signal type; and if it is detected that the second signal satisfies a preset condition for malicious eavesdropping, the second signal is classified as a third signal type.

In an embodiment, the step that the second signal and its signal type are acquired and the protection process among multiple protection processes is selected and executed according to the signal type may include that:

when the second signal pertains to the first signal type, a first mode of the multiple protection processes is initiated, so as to implement radiation protection control;

when the second signal pertains to the second signal type, a second mode of the multiple protection processes is initiated, so as to implement anti-interference control; and when the second signal pertains to the third signal type, a third mode of the multiple protection processes is initiated, so as to implement anti-eavesdropping control.

In an embodiment, the step that the first signal received from the outside is converted, through pre-processing, into the second signal which can be identified by the baseband chip of the terminal may include that:

the first signal subjected to segmented frequency sweep and signal separation is filtered via a first stage BPF, the filtered signal is amplified via an LNA, then frequency mixing is performed on the amplified signal such that the frequency of the mixed signal supports demodulation within a frequency band range of the terminal, and the mixed signal is filtered and demodulated to obtain the second signal.

In the terminal according to the embodiments of the disclosure, a radiation processing module is arranged to convert, through pre-processing, a first signal received from the outside into a second signal which can be identified by a baseband chip of a terminal. A radiation diagnosis module is arranged to extract signal characteristics represented by the second signal, classify the second signal by comparing the signal characteristics, diagnose to obtain a signal type to which the second signal pertains, and output the second signal to a radiation protection control module for executing a protection process for the signal type. The radiation protection control module is arranged to acquire the second signal and its signal type, and select and execute a protection process among multiple protection processes according to the signal type. By means of the embodiments of the disclosure, the problem about implementing multiple protections for a terminal can be solved, and particularly, the aim of implementing multiple protections while keeping cost low can be achieved.

DETAILED DESCRIPTION

The implementation of the technical solutions will be further described in detail hereinbelow in conjunction with the drawings.

Figure 1:
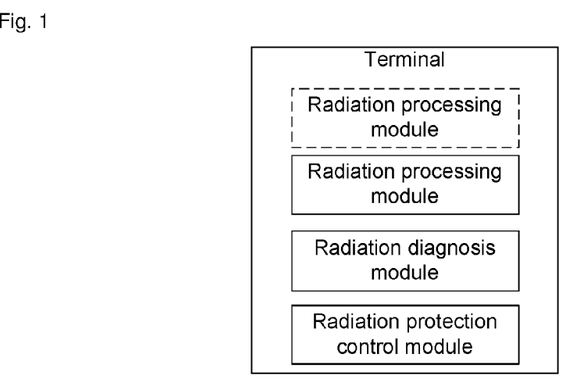
FIG. 1 is a composition structure diagram of a basic framework according to a terminal embodiment of the disclosure.

The embodiments of the disclosure provide a terminal. As shown in FIG. 1, the terminal includes:

a radiation processing module arranged to convert, through pre-processing, a first signal received from the outside into a second signal which can be identified by a baseband chip of the terminal;

a radiation diagnosis module arranged to extract signal characteristics represented by the second signal, classify the second signal by comparing the signal characteristics, diagnose to obtain a signal type to which the second signal pertains, and output the second signal to a radiation protection control module for executing a protection process for the signal type; and the radiation protection control module arranged to acquire the second signal and its signal type, and select and execute a protection process among multiple protection processes according to the signal type.

In a preferred implementation of the disclosure, the radiation protection control module further includes at least two of the following sub-modules:

a first protection control sub-module, corresponding to a subsequent triple protection scenario, specifically being a radiation protection control module arranged to, when the second signal pertains to a first signal type, initiate a first mode of the multiple protection processes, so as to implement radiation protection control;

a second protection control sub-module, corresponding to a subsequent triple protection scenario, specifically being an anti-interference control module arranged to, when the second signal pertains to a second signal type, initiate a second mode of the multiple protection processes, so as to implement anti-interference control; and a third protection control sub-module, corresponding to a subsequent triple protection scenario, specifically being an anti-detection control module arranged to, when the second signal pertains to a third signal type, initiate a third mode of the multiple protection processes, so as to implement anti-eavesdropping control.

In a preferred implementation of the disclosure, the terminal further includes:

a radiation receiving module, located in front of the radiation processing module, and connected to the radiation processing module, the radiation receiving module being arranged to receive the first signal from the outside of the terminal, and output the first signal to the radiation processing module for pre-processing, the first signal including: a communication signal and/or an electromagnetic wave signal.

In a preferred implementation of the disclosure, the terminal further includes:

a radiation control module and a radiation detection module, herein the radiation control module is connected to the radiation processing module, the radiation detection module, the baseband chip, the radiation diagnosis module and the radiation receiving module, and the radiation control module is arranged to send a control instruction to control all modules connected thereto, such that all the modules connected thereto implement, in an entire radiation process according to the control instruction, signal pre-processing, signal detection, switching of the baseband chip between a detection mode and a normal radio working mode, signal diagnosis, and activating and deactivating of the protection process among the multiple protection processes.

In a preferred implementation of the disclosure, the radiation detection module is arranged to implement pre-processing for classification and identification of the second signal, and output the pre-processed signal to the radiation control module for making a decision, the second signal being classified into: a single-carrier signal, a noise signal and a modulation signal; and the radiation control module is further arranged to, after the decision is made for the pre-processed signal, output the control instruction and the pre-processed signal to the radiation diagnosis module for classifying the pre-processed signal so that the protection process is selected.

In a preferred implementation of the disclosure, the radiation diagnosis module is further arranged to: filter out internal self-radiation and interference signals and then classify the second signal; if it is detected that the strength or dose of the second signal reaches a threshold, classify the second signal as the first signal type; if it is detected that the second signal interferes with a current in-use signal and frequency band, classify the second signal as the second signal type; and if it is detected that the second signal satisfies a preset condition for malicious eavesdropping, classify the second signal as the third signal type.

Figure 2:
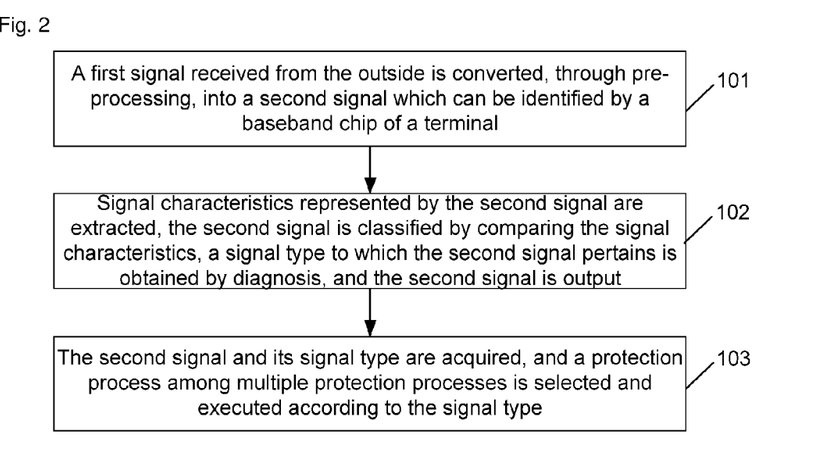
FIG. 2 is a flowchart of an implementation principle according to a method embodiment of the disclosure.

The embodiments of the disclosure provide a multiple protection method for a terminal. As shown in FIG. 2, the method includes the following steps.

Step 101: A first signal received from the outside is converted, through pre-processing, into a second signal which can be identified by a baseband chip of a terminal.

Step 102: Signal characteristics represented by the second signal are extracted, the second signal is classified by comparing the signal characteristics, a signal type to which the second signal pertains is obtained by diagnosis, and the second signal is output.

Step 103: The second signal and its signal type are acquired, and a protection process among multiple protection processes is selected and executed according to the signal type.

In a preferred implementation of the disclosure, the method further includes that:

before the step that a first signal received from the outside is converted, through pre-processing, into a second signal which can be identified by a baseband chip of a terminal, it is detected whether to activate multiple protection processes, and if so, it switches to a radiation detection mode to trigger extraction of the signal characteristics represented by the second signal, so as to classify the second signal.

In a preferred implementation of the disclosure, the step that a first signal received from the outside is converted, through pre-processing, into a second signal which can be identified by a baseband chip of a terminal includes that:

an intermediate frequency signal is formed by means of separation, filtration, amplification and down-conversion mixing performed on the first signal; and the second signal is obtained by means of second stage filtration and detection demodulation performed on the intermediate frequency signal.

In a preferred implementation of the disclosure, the method further includes that:

after the step that a first signal received from the outside is converted, through pre-processing, into a second signal which can be identified by a baseband chip of a terminal, a type of an electromagnetic signal is pre-determined and separated by means of spectral characteristics of different electromagnetic waves to obtain a pre-processed signal.

In a preferred implementation of the disclosure, the step that signal characteristics represented by the second signal are extracted, the second signal is classified by comparing the signal characteristics and a signal type to which the second signal pertains is obtained by diagnosis includes that:

internal self-radiation and interference signals are filtered out, and then the second signal is classified;

if it is detected that the strength or dose of the second signal reaches a threshold, the second signal is classified as a first signal type;

if it is detected that the second signal interferes with a current in-use signal and frequency band, the second signal is classified as a second signal type; and if it is detected that the second signal satisfies a preset condition for malicious eavesdropping, the second signal is classified as a third signal type.

In a preferred implementation of the disclosure, the step that the second signal and its signal type are acquired and a protection process among multiple protection processes is selected and executed according to the signal type includes that:

when the second signal pertains to the first signal type, a first mode of the multiple protection processes is initiated, so as to implement radiation protection control;

when the second signal pertains to the second signal type, a second mode of the multiple protection processes is initiated, so as to implement anti-interference control; and when the second signal pertains to the third signal type, a third mode of the multiple protection processes is initiated, so as to implement anti-eavesdropping control.

In conclusion, the embodiments of the disclosure mainly include the following contents.

From the perspective of a terminal, a triple protection terminal includes: a radiation receiving module, a radiation detection module, a radiation control module, a radiation processing module, a radiation diagnosis module, a radiation protection control module, an anti-interference control module, an anti-detection control module, a radio frequency front end module, a radio frequency chip module, a baseband chip, and a Liquid Crystal Display (LCD) module.

A basic flow under a triple protection scenario is implemented by using the aforementioned modules, and includes that: (1) when a user initiates an electromagnetic triple protection mode, a mobile phone is switched to a radiation detection mode, and receives all electromagnetic radiation signals via an improved inbuilt antenna, an intermediate frequency signal is formed by means of separation, filtration, amplification and down-conversion mixing performed on the electromagnetic radiation signals, an IQ signal which can be identified by a baseband chip of the mobile phone is formed by means of second stage filtration and detection demodulation, and a detected dynamic digital radiation frequency point and amplitude value distribution diagram is formed by means of power time integral processing performed on the IQ signal; and (2) internal self-radiation and external strong radiation are filtered out by means of diagnosis of the radiation diagnosis module, and transferred to the corresponding radiation protection control module according to the dose size to execute a control process for a signal type.

Herein, in terms of control over diagnosis of the radiation diagnosis module, the radiation protection control module executes a control process for a corresponding signal type in the following three solutions as for triple protection.

1. A mobile phone is controlled to warn excessive radiation or radiation harmful to a human body with an image, to guide behaviours, and to be far away from the range and direction of a radiation area.

2. If it is detected that a radiation signal interferes with a current in-use signal and frequency band, an anti-interference control module is initiated to filter an interference signal or to start behaviour guidance, or a current communication frequency band is automatically switched to other non-interference states.

3. If it is detected that the interference signal is a malicious detection electromagnetic signal, a corresponding anti-detection control module is initiated to encrypt current air interface information, to actively transmit error information to perform same-frequency interference on an electromagnetic wave, and to disturb an eavesdropping system of an opposite part whilst self-encryption.

The aforementioned application scenario in the embodiments of the disclosure is to design a hardware system in a smart terminal for triple protection corresponding to an electromagnetic radiation prevention function, a signal interference prevention function and an eavesdropping prevention function, and an electromagnetic radiation prevention detection function and interference influence prevention, anti-detection and anti-eavesdropping functions may be achieved, so as to guarantee that a user can use the terminal under a safe and healthy environment.

Under the application scenario, the embodiments of the disclosure are adopted, a triple protection integrated hardware system is designed to fully consider integrated demands of a user for anti-interference of an electromagnetic wave, radiation protection and anti-eavesdropping, reasonable improvement is performed by utilizing an existing circuit and system of a current terminal without needing to add a dedicated system, and the cost is saved. Moreover, the terminal is portable and light, and has an LCD screen enabling the user to check a surrounding radiation situation anytime, and a strong-interference weak-signal area can be avoided. Meanwhile, the security is high, malicious detection and eavesdropping signals can be detected and shielded, a safe, environmentally-friendly, smart and high-performance mobile terminal electromagnetic protection hardware system is provided for protection in conjunction with multiple protection modes constructed by a hardware module, it is ensured that the terminal smartly diagnoses a plurality of internal and external electromagnetic radiation sources and interference signal sources, and corresponding measures and modes are taken to prevent corresponding electromagnetic damages, such that the user may safely enjoy high-performance communication quality and data services in an environmentally friendly manner under any circumstances.

The embodiments of the disclosure will be specifically elaborated hereinbelow.

Figure 3:
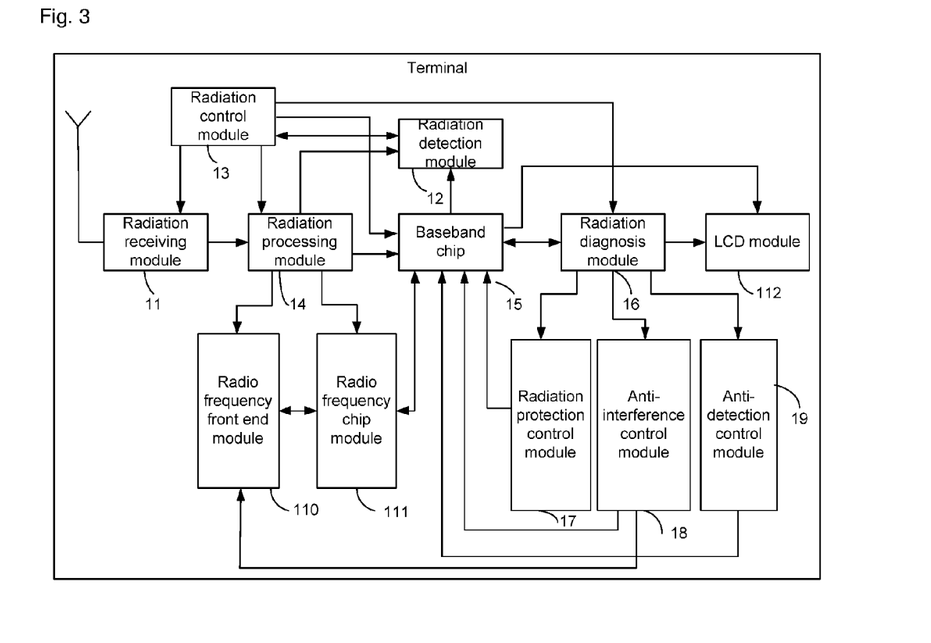
FIG. 3 is a hardware structure diagram of a triple protection smart terminal under a triple protection scenario according to embodiment 1 of the disclosure.

FIG. 3 is a structure diagram on the basis of a triple protection smart terminal according to an embodiment of the disclosure. As shown in FIG. 3, the mobile terminal includes a radiation receiving module 11, a radiation detection module 12, a radiation control module 13, a radiation processing module 14, a baseband chip 15, a radiation diagnosis module 16, a radiation protection control module 17, an anti-interference control module 18, an anti-detection control module 19, a radio frequency front end module 110, a radio frequency chip module 111, and an LCD module 112.

Specific functions of each module will be elaborated hereinbelow.

Herein, the radiation receiving module 11 is connected to the radiation processing module 14 and the radiation control module 13, and arranged to implement receiving of an external communication signal and an electromagnetic wave signal. The radiation receiving module 11 adopts an antenna built in a mobile phone, the form of the antenna may be a support antenna, an FPC antenna and an LDS antenna, and the type of the antenna may be a PIFA, an IFA, an MONO, or the aforementioned antenna and other coupled and parasitic units, and in order to implement the high efficiency thereof, the LDS antenna of an bandwidth-expanded IFA may be taken as an example. The radiation receiving module 11 further includes a high-precision small-step antenna tuning chip, composed of a control circuit and a variable capacitor. The value of the variable capacitor may be automatically adjusted according to a current antenna frequency point to generate a corresponding VSWR resonance point so as to receive different electromagnetic wave signals. A broadband antenna is matched to realize receiving of electromagnetic wave signals of different frequency points and bandwidths. The frequency of the receiving module may be minimal to dozens of M, and may be maximal to 6 GHz. As the energy and frequency of an electromagnetic wave are directly proportional, the energy will be higher while the frequency is higher, so the radiation of the electromagnetic wave having a higher frequency is larger. Due to limitation to bandwidth of a demodulator built in the mobile phone and the antenna, the receiving module is mainly sensitive to receiving of a frequency signal of which the frequency is higher than 500 MHz. If there is a special detection requirement, further expansion may be performed by improving the demodulator and expanding the antenna. A specific working process is as follows. When the mobile phone opens a UI instruction of a detection control module, a radiation receiving module is controlled to adjust a parameter value of the antenna tuning chip, and scans a standing-wave ratio value of each of received frequency band signal voltages until the antenna is tuned to an optimal efficiency point of each frequency band. When a signal of a corresponding frequency point is detected, the radiation receiving module matches a receiving signal and then transmits the receiving signal to a rear-end radiation detection module.

The radiation detection module 12 is connected to the radiation control module 13, the radiation processing module 14 and the baseband chip, and arranged to implement classification and identification of radiation signals. Herein, external electromagnetic wave signals are divided into a CW single-carrier signal, a noise signal and a modulation signal. Different signal pre-processing operations need to be executed on different signal types so as to achieve classified identification. The radiation detection module 12 performs detection identification by means of spectral characteristics of different electromagnetic waves. Each spectral characteristic model is stored in the radiation detection module, and identification may be implemented by spectral sampling and comparison. A signal processed by the radiation processing module 14 or a digital signal result demodulated by the baseband chip is transmitted and returned to the radiation detection module. The radiation detection module pre-determines and separates the signal type, and feeds a result back to the radiation control module 13, and the radiation control module 13 makes a decision whether to take corresponding protection measures.

The radiation control module 13 is connected to the radiation receiving module 11, the radiation detection module 12, the radiation processing module 14, the baseband chip 15 and the radiation diagnosis module 16, and arranged to implement the whole radiation detection, diagnosis and activating and deactivating of protection control. The radiation control module 13 controls the baseband chip to be switched between a detection mode and a normal radio working mode, the whole mobile phone may work under a single radio normal mode, or may work under a single detection mode, and can work under the co-existence of the aforementioned two modes, and the radiation control module 13 may be directly set on a UI by the user. As a radio frequency channel is only arranged as one-path transmitting and receiving within the same time, the radiation control module 13 is responsible for closing a conventional communication channel to give resources to the radiation control module 13 for use, so as to make the detection more accurate. Certainly, the radio frequency channel may only receive an external non-communication signal, or may only receive an external communication signal, or may receive both signals, so as to test influence and interference of an external electromagnetic signal to an original communication signal. Meanwhile, the radiation control module 13 is also responsible for monitoring the radiation change of a currently received signal and a collected diagnosis data result in real time, and executing corresponding operations.

The radiation processing module 14 is connected to the radiation receiving module 11, the radiation control module 13, the radiation detection module 12, the radio frequency front end module 110, the radio frequency chip module 111 and the baseband chip 15, and is arranged to implement processing of a radio frequency signal of each received electromagnetic radiation signal by fully utilizing an existing radio frequency front end module and a hardware circuit of a radio frequency chip of a mobile phone. After the radiation control module 13 is initiated, an electromagnetic wave signal is received from the radiation receiving module 11, the electromagnetic wave signal subjected to segmented frequency sweep and signal separation is filtered via a first stage BPF, low-noise amplification is performed on the filtered signal via an LNA, and then the amplified signal is sent to a mixer unit of a radio frequency chip. The radio frequency chip changes an appropriate local oscillator frequency and performs down-conversion mixing with a received signal frequency, such that the mixed intermediate frequency signal is a signal capable of being demodulated within a frequency band range of the mobile phone, the intermediate frequency signal is filtered by a second stage LPF built in the mobile phone and demodulated into an IQ signal by a detection tube, the IQ signal is transmitted to the baseband chip, and a detected dynamic digital radiation frequency point and amplitude value distribution diagram is formed by power time integral processing, and is displayed in an LCD interface program interface window. In the aforementioned design, a full-band single-pole multi-throw switch built in the mobile phone may be directly reused for signal separation, an RX filter built in the mobile phone is adopted for signal filtration, and the diversity of a radiation signal frequency may be improved; intermediate frequency signals which can be identified by the demodulator in the mobile phone are limited, so a mixing unit needs to continuously change a VCO value, and different frequency synthesis demands are met by means of a PLL built in the mobile phone. So, the radiation processing module is mainly improved in a mixing circuit in the radio frequency chip module, a signal frequency input by the mixing circuit under the control of an external variable mixing input unit is changed, so the signal frequency is the same as a signal frequency of an external electromagnetic wave, thereby making the intermediate frequency signal obtained by down-conversion always demodulated and detected. As the current mobile phone chip may demodulate a plurality of groups of high-frequency, intermediate-frequency and low-frequency reference communication frequency band signals, the circuit of which the mixing structure is changed may basically cover all high-, intermediate-, and low-external electromagnetic wave signals. Meanwhile, various signal conversion algorithms and differences are stored in the radiation processing module, and a corresponding intermediate frequency signal may be adaptively and quickly obtained.

The baseband chip 15 is connected to the radiation detection module 12, the radiation control module 13, the radiation processing module 14, the radiation diagnosis module 16, the radiation protection control module 17, the anti-interference control module 18, the anti-detection control module 19, the radio frequency chip module 111 and the LCD module 112, and is mainly responsible for coordination control and calculation of each module, and digital processing of the IQ signal demodulated by the radiation processing module, including calculation of signal strength and a frequency point, integration and statistics, sending of a statistical calculation result to the radiation diagnosis module, and dynamic displaying of an electromagnetic wave power strength frequency point diagram in a specified detection window of an LCD interface.

The radiation diagnosis module 16 is connected to the baseband chip 15, the radiation control module 13, the radiation protection control module 17, the anti-interference control module 18, the anti-detection control module 19 and the LCD module 112, and implements detailed diagnosis analysis of a radiation signal, including radiation property determination, dose evaluation, and protection measure selection. The radiation diagnosis module filters out internal self-radiation and interference signals according to collected data of the baseband chip, and selects external strong radiation and interference signals. If the current radiation signal strength and dose are large and a signal frequency band is harmful to a human body, the radiation protection control module will be initiated. If interference, such as adjacent-channel interference, radiation stray and harmonics, to a current in-use signal and frequency band is diagnosed, the anti-interference control module is initiated; and if it is diagnosed that the interference signal is a malicious detection electromagnetic signal, the corresponding anti-detection control module is initiated. Various electromagnetic wave parameter models are registered in the radiation diagnosis module, various external and intrinsic signals may be subjected to parameter comparison to determine each signal type, and to decide whether the signal size is within a safe threshold range. Meanwhile, a radiation control mode switched to a co-existence mode will be automatically invoked, that is, under an opening communication mode, the influence of a current radiation signal on parameters such as the present communication signal RSSI and a signal-to-noise ratio is evaluated to decide whether to take corresponding protection measures.

The radiation protection control module 17 is connected to the radiation diagnosis module 16 and the baseband chip 15, and mainly implements protection against an electromagnetic radiation signal. The radiation protection control module initiates the radiation protection control module if it has been determined that the radiation dose exceeds the standard and there is a potential hazard to the body of the user according to an output result of the radiation diagnosis module, and controls, together with a baseband chip module, a mobile phone program to warn excessive radiation or radiation harmful to a human body with an image, to remind if the standard is exceeded or to produce a sound. Meanwhile, a safe distance and a radiation attenuation direction distribution are estimated according to a built-in radiation attenuation algorithm, and the behaviours of the user are correspondingly guided, to make the user away from the range and direction of a strong radiation area.

The anti-interference control module 18 is connected to the radiation diagnosis module 16, the radio frequency front end module 110 and the baseband chip 15, and mainly implements protection against an interference signal. If the radiation diagnosis module 16 detects that a radiation signal interferes with a current in-use signal and frequency band, the anti-interference control module is initiated. The anti-interference control module is initiated in an active mode and a passive mode. The active mode will filter the received interference signal, switch a current communication frequency band to a non-interference frequency band, or switch a communication channel to other non-interference channels. The passive mode includes user behaviour guidance, mobile phone signal quality evaluation, and interference signal early warning. Under the active mode, if an interference signal may be filtered in the receiving module, the radio frequency front end circuit directly switches to a corresponding filter to be connected to a main receiving passage mode in series, and directly filters the interference signal thereof from a transmission path. If a signal adjacent to a frequency band is difficult to filter, the mobile phone may be connected to a high-selectivity and out-of-band rejection FBAR filter in series, and an adjacent-frequency electromagnetic wave signal is directly filtered off. If a same-frequency signal is the same as a communication frequency band, the communication frequency may be switched to a communication frequency band capable of being supported by other mobile phones, or a communication channel is switched to a channel side away from the interference signal. Under the passive mode, a corresponding interference behaviour reduction mode may be generally initiated for an interference signal which is difficult to directly filter. For example, a handholding mode of the mobile phone, an antenna receiving direction and a small interference direction guidance are changed. After the signal quality of other mobile phone conditions in the same area is counted for high probability or continuously abnormal interference, signal quality evaluation and ranking may be performed on a current user mobile phone so as to eliminate interference caused by the anti-interference difference of the mobile phone. That is, the problem of hardware quality of the mobile phone is fed back, and a new phone with better performance may be replaced accordingly. Meanwhile, under the passive mode, the magnitude and amplitude of the interference signal may be cleared, and displayed on a corresponding LCD anti-interference display program interface so as to give an early warn for the interference signal.

The anti-detection control module 19 is connected to the radiation diagnosis module 16 and the baseband chip 15, and mainly implements prevention for malicious detection or eavesdropping. If the radiation diagnosis module detects that the interference signal is a malicious detection electromagnetic signal, the corresponding anti-detection control module is opened, thereby initiating an air interface encryption mode, a large-scramble code communication mode and an active interference mode. The air interface encryption mode mainly invokes a higher-strength algorithm in the baseband chip to perform air interface encryption on a current voice, a short message or uploaded and downloaded data, or it is necessary to input a specific key to normally open the transmitted information, so as to improve the safety of communication information. The large-scramble code communication mode mainly aims at the characteristics of different scrambling algorithms of various communication systems of a multi-mode mobile phone; a selection algorithm is more difficult to switch; as for an anti-eavesdropping high-safety communication protocol, if the scrambling strength of CDMA is higher than that of WCDMA and the scrambling strength of the WCDMA is higher than that of GSM, the spreading scrambling number is larger, the algorithm is more complicated, and the link transmission safety is higher. The active interference mode refers to disturbing eavesdropping of an eavesdropping system of an opposite party by actively transmitting a same-frequency interference electromagnetic wave with error information, and is implemented by the radio frequency chip and the radio frequency front end module under the control of the baseband chip.

The radio frequency front end module 110 is connected to the radiation processing module 14, the anti-interference control module 18 and the radio frequency chip module, and implements radio frequency front end processing of a radiation detection signal, radio frequency receiving filtration of an interference signal in the anti-interference control module, active transmission of an interference signal in the anti-detection control module, and transmitting and receiving of an original communication link of the mobile phone. The radio frequency front end module is composed of radio frequency front end devices built in the mobile phone, including an antenna switch, a frequency divider, a duplexer, a receiving filter, a transmitting filter, a power amplifier and the like, and mainly implements pre-processing for transmitting and receiving of a radio frequency signal in front of the radio frequency chip module.

The radio frequency chip module 111 is connected to the radiation processing module 14, the radio frequency front end module 110 and the baseband chip 15, and mainly implements radio frequency processing of the received radiation signal, including filtration, up- and down-conversion, amplification, detection and the like. Meanwhile, original communication transmitter and receiver functions of the mobile phone are combined.

The LCD module 112 is connected to the baseband chip 15, and mainly implements displaying of radiation signal strength and frequency points, radiation distribution and behaviour guidance in conjunction with a radiation strength integral algorithm and detection software in the baseband chip.

Figure 4:
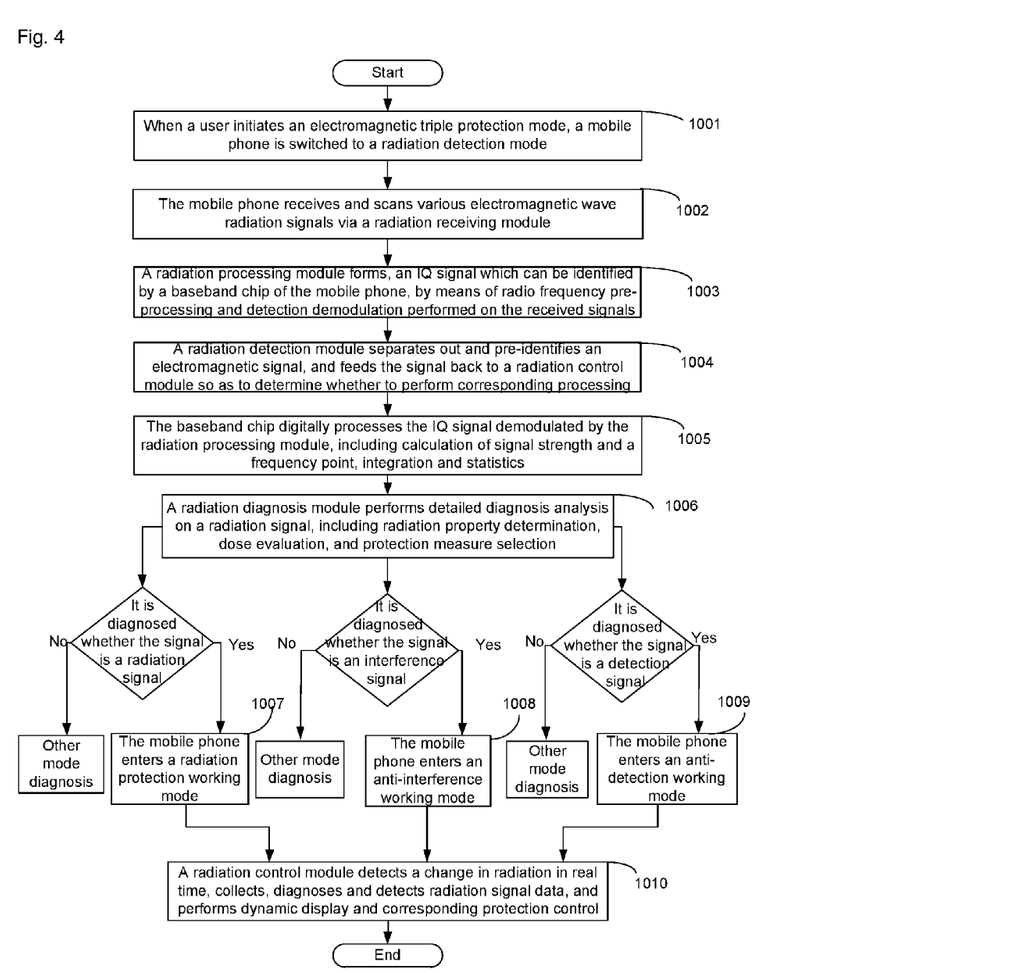
FIG. 4 is a specific working flowchart of a triple protection terminal under a triple protection scenario according to embodiment 1 of the disclosure.

On the basis of the multi-mode anti-eavesdropping flowchart of a mobile terminal having a triple protection function as shown in FIG. 3, as shown in FIG. 4, the flow includes the following steps.

Step 1001: When a user initiates an electromagnetic triple protection mode, a mobile phone is switched to a radiation detection mode, and then Step 1002 is executed.

Step 1002: The mobile phone receives and scans various electromagnetic wave radiation signals via a radiation receiving module, the signals wait for being processed, and Step 1003 is executed.

Step 1003: A radiation processing module performs separation, filtration, amplification and down-conversion mixing performed on the received signals to form an intermediate frequency signal, an IQ signal which can be identified by a baseband chip of the mobile phone is formed by means of second stage filtration and detection demodulation, and Step 1004 is executed.

Step 1004: A radiation detection module pre-determines and separates a type of an electromagnetic signal by means of spectral characteristics of different electromagnetic waves, and feeds the signal back to a radiation control module so as to determine whether to perform corresponding processing, if not, the flow is ended, and if so, Step 1005 is executed.

Step 1005: The baseband chip digitally processes the IQ signal demodulated by the radiation processing module, including calculation of signal strength and a frequency point, integration and statistics, and then Step 1006 is executed.

Step 1006: A radiation diagnosis module performs detailed diagnosis analysis on a radiation signal, including radiation property determination, dose evaluation, and protection measure selection; if it is diagnosed that the radiation signal is a large-dose radiation signal harmful to a human body, Step 1007 is executed; if it is diagnosed that the radiation signal is a communication interference signal, Step 1008 is executed; and if it is diagnosed that the radiation signal is a malicious detection signal, Step 1009 is executed.

Step 1007: A radiation protection control module controls the mobile phone to warn an excessive signal of harm to a human body according to a diagnosis result, estimates a safe distance and a radiation attenuation direction distribution according to a built-in radiation attenuation algorithm, and guides the behaviours of a user, to make the user away from the range and direction of a strong radiation area, and then Step 1010 is executed.

Step 1008: An anti-interference control module performs active filtration, channel switching, or passive avoidance, early warning and performance detection on an interference signal according to a detected interference signal frequency property, and then Step 1010 is executed.

Step 1009: An anti-detection control module initiates a corresponding air interface encryption mode, a large-scramble code communication mode or an active interference mode according to a detected malicious detection electromagnetic signal property, and then Step 1010 is executed.

Step 1010: A radiation control module detects a change in radiation in real time, collects, diagnoses and detects radiation signal data, and performs dynamic display and corresponding protection control, and the flow is ended.

Obviously, compared with prior art, the embodiments of the disclosure have the advantages that a traditional electromagnetic wave detection system is eliminated, smart and integrated electromagnetic wave protection is implemented by utilizing an existing internal hardware/software system of a mobile phone, the cost of a peripheral device is reduced, and the mobile phone is more applicable and environmentally friendly. Meanwhile, radiation processing and evaluation are more scientific and reasonable, different solutions can be provided for different signal types, radiation and interference can be filtered whilst a user is assisted in radiation identification and assisted to be away from radiation, the signal experience and communication quality of the user are improved, a malicious signal can be actively processed, the anti-eavesdropping and anti-detection effects are achieved, a safety curtain is provided for use of a mobile phone of the user, and the user can use the mobile phone safely and efficiently in an environmentally friendly manner without worry.

Or, when being implemented in form of software function module and sold or used as an independent product, the integrated module of the embodiment of the disclosure may also be stored in a computer-readable storage medium. Based on such an understanding, the technical solutions of the embodiment of the disclosure substantially or parts making contributions to prior art may be embodied in form of software product, and the computer software product is stored in a storage medium, including a plurality of instructions arranged to enable a piece of computer equipment (which may be a personal computer, a server, network equipment or the like) to execute all or part of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk. Thus, the embodiments of the disclosure are not limited to combination of any specific hardware and software.

Correspondingly, the embodiments of the disclosure also provide a computer storage medium, in which a computer program is stored. The computer program is used for executing the multiple protection method for a terminal according to the embodiments of the disclosure.

The above is only the preferred embodiments of the disclosure and not intended to limit the scope of protection of the disclosure.

INDUSTRIAL APPLICABILITY

In the terminal according to the embodiments of the disclosure, a radiation processing module is arranged to convert, through pre-processing, a first signal received from the outside into a second signal which can be identified by a baseband chip of a terminal. A radiation diagnosis module is arranged to extract signal characteristics represented by the second signal, classify the second signal by comparing the signal characteristics, diagnose to obtain a signal type to which the second signal pertains, and output the second signal to a radiation protection control module for executing a protection process for the signal type. The radiation protection control module is arranged to acquire the second signal and its signal type, and select and execute a protection process among multiple protection processes according to the signal type. By means of the embodiments of the disclosure, the problem about implementing multiple protections for a terminal can be solved, and particularly, the aim of implementing multiple protections while keeping cost low can be achieved.

What is claimed is:

1. A terminal, comprising:
  a memory storing processor-executable instructions; and
  a processor arranged to execute the stored processor-executable instructions to perform steps of:
    converting, through pre-processing, a first signal received from the outside into a second signal which can be identified by a baseband chip of the terminal;
    extracting signal characteristics represented by the second signal, classifying the second signal by comparing the signal characteristics, diagnosing to obtain a signal type to which the second signal pertains, and outputting the second signal; and
    acquiring the second signal and its signal type, and selecting and executing a protection process among multiple protection processes according to the signal type,
    wherein the step of extracting signal characteristics represented by the second signal, classifying the second signal by comparing the signal characteristics and diagnosing to obtain the signal type to which the second signal pertains comprises:
      filtering out internal self-radiation and interference signals, and then classifying the second signal;
      if it is detected that the strength or dose of the second signal reaches a threshold, classifying the second signal as a first signal type;
      if it is detected that the second signal interferes with a current in-use signal and frequency band, classifying the second signal as a second signal type; and if it is detected that the second signal satisfies a preset condition for malicious eavesdropping, classifying the second signal as a third signal type,
wherein the step of acquiring the second signal and its signal type and selecting and executing the protection process among the multiple protection processes according to the signal type comprises:
when the second signal pertains to the first signal type, initiating a first mode of the multiple protection processes, so as to implement radiation protection control;
when the second signal pertains to the second signal type, initiating a second mode of the multiple protection processes, so as to implement anti-interference control; and
when the second signal pertains to the third signal type, initiating a third mode of the multiple protection processes, so as to implement anti-eavesdropping control.

2. The terminal according to claim 1, wherein the processor is arranged to execute the stored processor-executable instructions to further perform a step of:
before the step of converting, through pre-processing, the first signal received from the outside into the second signal which can be identified by the baseband chip of the terminal, detecting whether to activate multiple protection processes, and if so, switching to a radiation detection mode to trigger extraction of the signal characteristics represented by the second signal, so as to classify the second signal.

3. The terminal according to claim 2, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

4. The terminal according to claim 1, wherein converting, through pre-processing, the first signal received from the outside into the second signal which can be identified by the baseband chip of the terminal comprises:
forming an intermediate frequency signal by means of separation, filtration, amplification and down-conversion mixing performed on the first signal; and
obtaining the second signal by means of second stage filtration and detection demodulation performed on the intermediate frequency signal.

5. The terminal according to claim 4, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

6. The terminal according to claim 1, wherein the processor is arranged to execute the stored processor-executable instructions to further perform a step of:
after the step of converting, through pre-processing, the first signal received from the outside into the second signal which can be identified by the baseband chip of the terminal, pre-determining and separating a type of an electromagnetic signal by means of spectral characteristics of different electromagnetic waves to obtain a pre-processed signal.

7. The terminal according to claim 6, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

8. The terminal according to claim 1, wherein converting, through pre-processing, the first signal received from the outside into the second signal which can be identified by the baseband chip of the terminal comprises:
filtering, via a first stage Band Pass Filter (BPF), the first signal subjected to segmented frequency sweep and signal separation, amplifying the filtered signal via a Low Noise Amplifier (LNA), then performing frequency mixing on the amplified signal such that the frequency of the mixed signal supports demodulation within a frequency band range of the terminal, and filtering and demodulating the mixed signal to obtain the second signal.

9. A multiple protection method for a terminal, comprising:
converting, through pre-processing, a first signal received from the outside into a second signal which can be identified by a baseband chip of the terminal;
extracting signal characteristics represented by the second signal, classifying the second signal by comparing the signal characteristics, diagnosing to obtain a signal type to which the second signal pertains, and outputting the second signal; and
acquiring the second signal and its signal type, and selecting and executing a protection process among multiple protection processes according to the signal type,
wherein the step of extracting signal characteristics represented by the second signal, classifying the second signal by comparing the signal characteristics and diagnosing to obtain the signal type to which the second signal pertains comprises:
filtering out internal self-radiation and interference signals, and then classifying the second signal;
if it is detected that the strength or dose of the second signal reaches a threshold, classifying the second signal as a first signal type;
if it is detected that the second signal interferes with a current in-use signal and frequency band, classifying the second signal as a second signal type; and
if it is detected that the second signal satisfies a preset condition for malicious eavesdropping, classifying the second signal as a third signal type,
wherein the step of acquiring the second signal and its signal type and selecting and executing the protection process among the multiple protection processes according to the signal type comprises:

when the second signal pertains to the first signal type, initiating a first mode of the multiple protection processes, so as to implement radiation protection control;

when the second signal pertains to the second signal type, initiating a second mode of the multiple protection processes, so as to implement anti-interference control; and when the second signal pertains to the third signal type, initiating a third mode of the multiple protection processes, so as to implement anti-eavesdropping control.

10. The method according to claim 9, further comprising:
before the step of converting, through pre-processing, the first signal received from the outside into the second signal which can be identified by the baseband chip of the terminal, detecting whether to activate multiple protection processes, and if so, switching to a radiation detection mode to trigger extraction of the signal characteristics represented by the second signal, so as to classify the second signal.

11. The method according to claim 10, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

12. The method according to claim 9, wherein converting, through pre-processing, the first signal received from the outside into the second signal which can be identified by the baseband chip of the terminal comprises:
forming an intermediate frequency signal by means of separation, filtration, amplification and down-conversion mixing performed on the first signal; and
obtaining the second signal by means of second stage filtration and detection demodulation performed on the intermediate frequency signal.

13. The method according to claim 12, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

14. The method according to claim 9, further comprising:
after the step of converting, through pre-processing, the first signal received from the outside into the second signal which can be identified by the baseband chip of the terminal, pre-determining and separating a type of an electromagnetic signal by means of spectral characteristics of different electromagnetic waves to obtain a pre-processed signal.

15. The method according to claim 14, wherein converting, through pre-processing, the first signal received from the outside into the second signal which can be identified by the baseband chip of the terminal comprises:
filtering, via a first stage BPF, the first signal subjected to segmented frequency sweep and signal separation, amplifying the filtered signal via an LNA, then performing frequency mixing on the amplified signal such that the frequency of the mixed signal supports demodulation within a frequency band range of the terminal, and filtering and demodulating the mixed signal to obtain the second signal.

16. The method according to claim 9, wherein converting, through pre-processing, the first signal received from the outside into the second signal which can be identified by the baseband chip of the terminal comprises:
filtering, via a first stage Band Pass Filter (BPF), the first signal subjected to segmented frequency sweep and signal separation, amplifying the filtered signal via a Low Noise Amplifier (LNA), then performing frequency mixing on the amplified signal such that the frequency of the mixed signal supports demodulation within a frequency band range of the terminal, and filtering and demodulating the mixed signal to obtain the second signal.

* * * * *